INVENTOR.
JOSEPH F. McLAY
BY
his ATTORNEY.

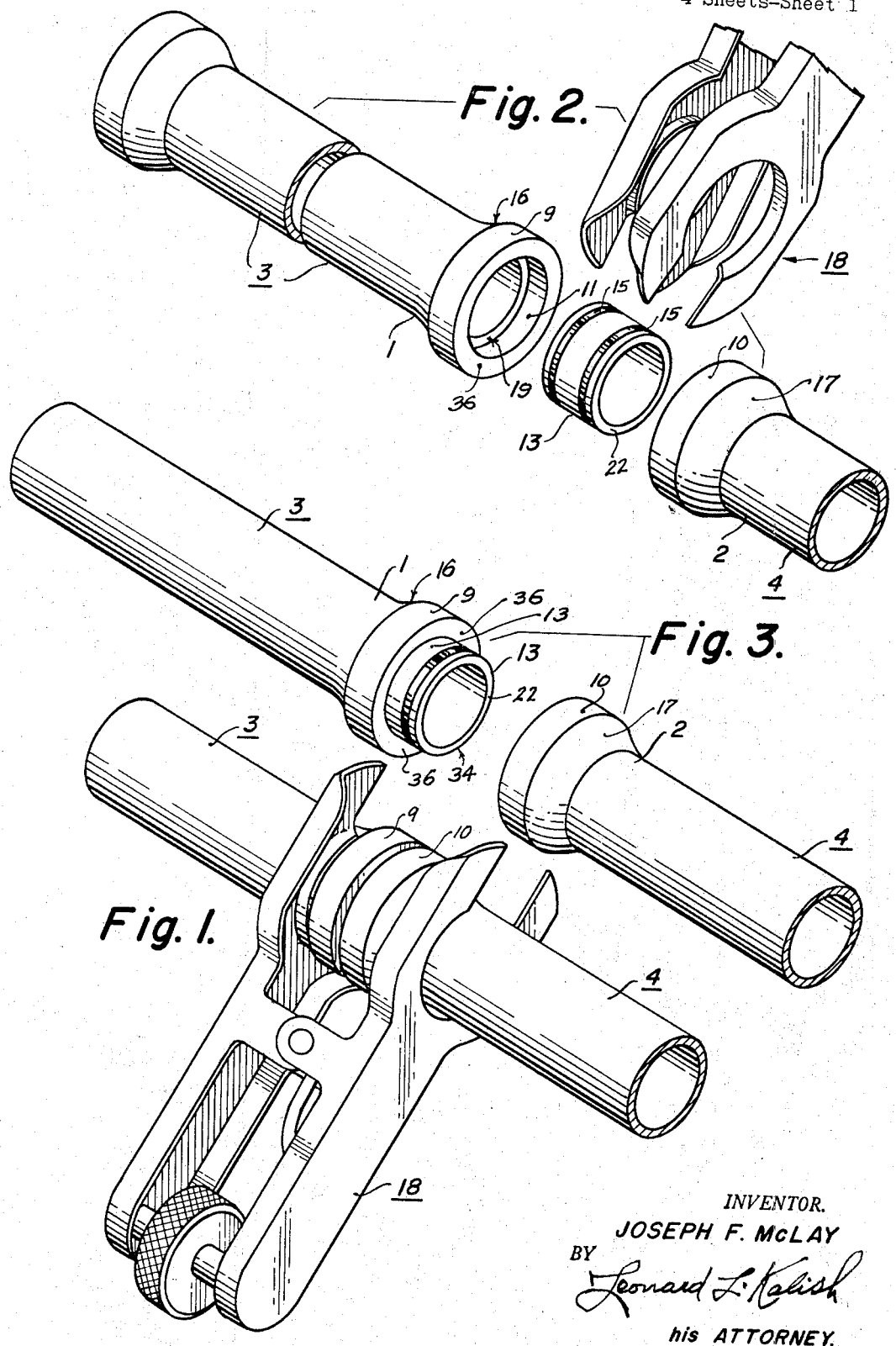

March 12, 1968   J. F. McLAY   3,372,949
JOINT CONSTRUCTION FOR GLASS PIPE AND THE LIKE
Filed May 21, 1965   4 Sheets-Sheet 3
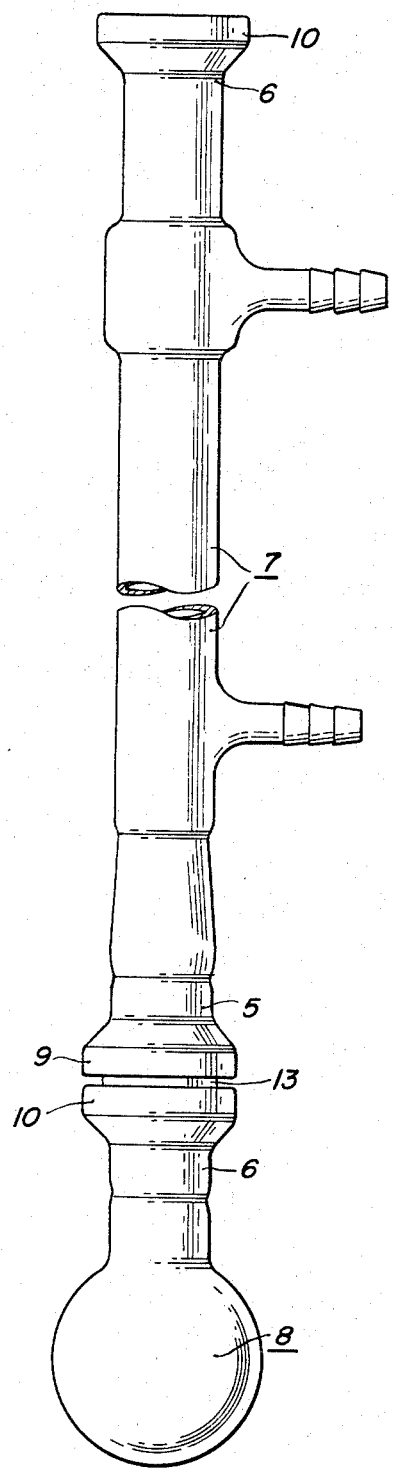
Fig. 6.
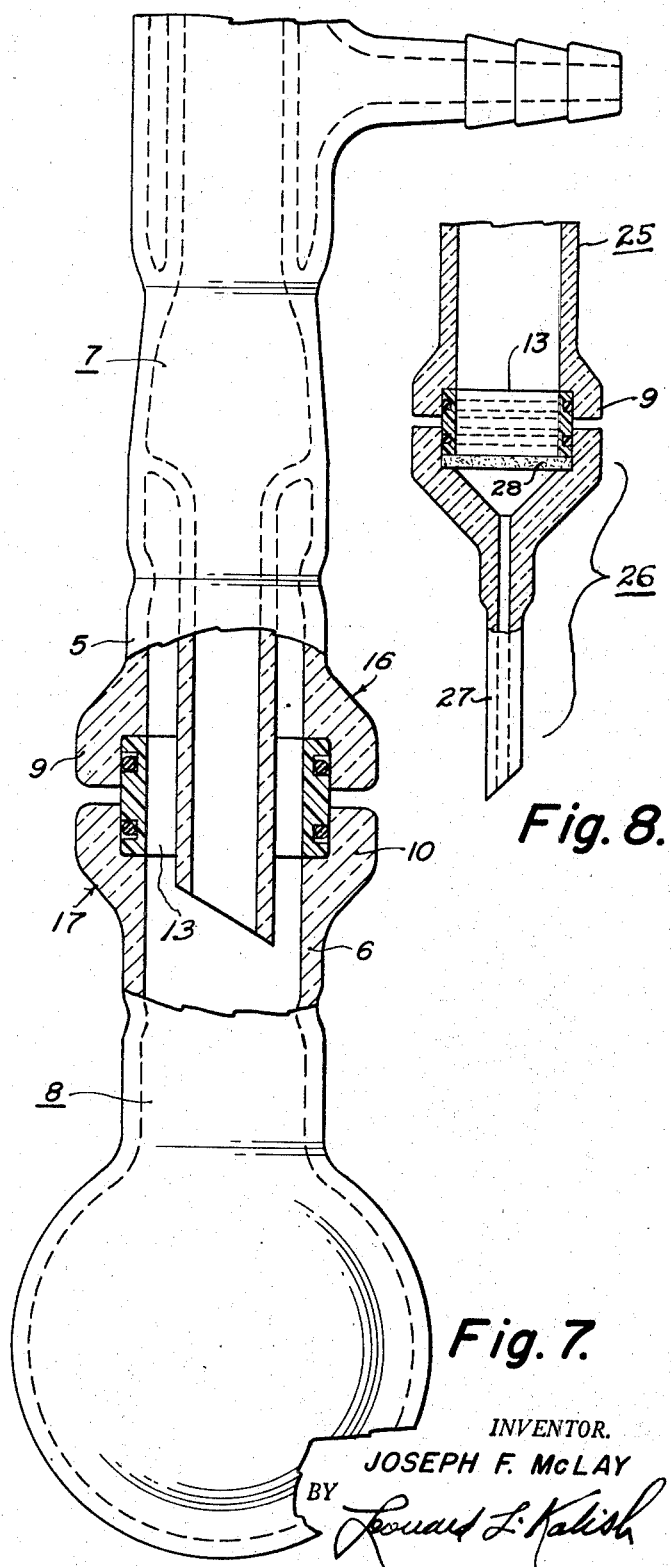
Fig. 7.
Fig. 8.
INVENTOR.
JOSEPH F. McLAY
BY Leonard L. Kalish
his ATTORNEY.

March 12, 1968   J. F. McLAY   3,372,949
JOINT CONSTRUCTION FOR GLASS PIPE AND THE LIKE
Filed May 21, 1965   4 Sheets-Sheet 4

INVENTOR.
JOSEPH F. McLAY
BY Leonard F. Kalish
his ATTORNEY.

United States Patent Office 3,372,949
Patented Mar. 12, 1968

3,372,949
JOINT CONSTRUCTION FOR GLASS PIPE
AND THE LIKE
Joseph F. McLay, Warminster, Pa., assignor to Fischer & Porter Company, Warminster, Pa., a corporation of Pennsylvania
Filed May 21, 1965, Ser. No. 457,703
10 Claims. (Cl. 285—364)

ABSTRACT OF THE DISCLOSURE

A glass joint construction for joining juxtaposed ends of two pieces of glass pipe of the kind used in chemical apparatus, in which the juxtaposed pipe-ends have enlarged coupling-bells with glazed cylindrical coupling-chambers therein whose inner diameter is substantially larger than the bore of the pipe and whose inner ends terminate at transverse annular shoulders between the coupling-chamber and the bore of the pipe, and a thin-walled Teflon coupling-sleeve of an axial length greater than the combined axial lengths of said coupling-chambers and having an outer diameter greater than the inner diameter of said coupling-chambers, telescoped into said coupling chambers with an interference fit, said coupling-sleeve having two ring-receiving grooves, one disposed in each of said coupling-chambers, and an O-ring in each of said ring-receiving grooves formed of an elastomer which is substantially more readily deformable than the Teflon sleeve.

---

The present invention relates to joint-constructions in in glass piping and in laboratory glassware which will permit two juxtaposed glass-pipe-ends or tube-ends to be quickly joined and attached to each other and to be quickly detached from each other and which will maintain or withstand pressure without leakage and be possessed of sufficient flexibility and breakage-resistance.

In the past, joints between successive pieces of laboratory glassware have been made by means of rubber stoppers and rubber hoses, and (more recently) by what are commonly called ground tapered joints and ground ball-and-socket joints.

The rubber-stopper type of joint and rubber hose joint have become largely obsolete because of their contaminating effect and also because of their susceptibility to deterioration under the influence of various chemicals and temperatures and so on.

Ground-glass tapered joints and ground-glass ball-and-socket joints require lubrication for maximum effectiveness, and if tapered joints are used, the joined members or glass components are jointed with virtually no flexibility—the tapered joint being a substantially rigid in-line joint. While the ground-glass ball-and-socket joint has flexibility by reason of the spherical shape of the jointed surfaces, yet it has other disadvantages and it is comparatively costly to produce and hence more expensive to use.

The present invention comprises a glass joint construction between juxtaposed ends of two pieces of glass pipe, including an enlarged coupling-bell at and integral with each pipe-end, each coupling-bell having a glazed cylindrical coupling - chamber therein substantially greater than the bore of the pipe and having its inner end terminating at a transverse annular shoulder between the coupling-chamber of the bore of the pipe, the wall-thickness of each coupling-bell being at least as great and preferably greater than the wall-thickness of the glass-pipe, a slightly flexible thin-walled Teflon coulping-sleeve of a length greater than the combined lengths of the two coupling-chambers and having an outer diameter greater than the inner diameter of the coupling-chamber and telescoped into said coupling-chambers with an interference fit, two ring-receiving grooves in the coupling-sleeve, one disposed within each of said coupling chambers, and an O-ring in each of said ring-receiving grooves formed of elastomer which is substantially more readily deformable than the material of the sleeve.

One of the objects of the present invention is a joint-construction by which two glass ends of the two pieces of laboratory glassware or the opposite juxtaposed ends of two pieces of glass piping or glass tubing may be quickly joined in a fluid-tight manner with minimum expense in construction and implements and also with sufficient flexibility to minimize breakage at the joint and also to eliminate the need for lubrication.

Other objects of the present invention will appear from the following description and the accompanying drawings.

In the accompanying drawings, in which like reference numerals indicate like parts, FIGURE 1 represents a perspective view of a glass pipe joint illustrating an embodiment of the present invention.

FIGURE 2 represents an exploded perspective view of same.

FIGURE 3 represents a similar perspective view with the coupling-sleeve operatively disposed in the coupling-chamber in one of the pipe-ends.

FIGURE 6 represents an elevational view of two pieces of laboratory glassware, namely, the condenser and a flask, having their juxtaposed tubular ends coupled by the joint construction of the present invention.

FIGURE 7 represents an enlarged longitudinal cross-section, of the joint shown in FIGURE 6.

FIGURE 8 represents a longitudinal axial cross-sectional view of the joined tubular ends of two pieces of laboratory glass apparatus of substantially different diameters, and wherein the depth of the respective coupling-chambers are also different.

Figures 4, 5:
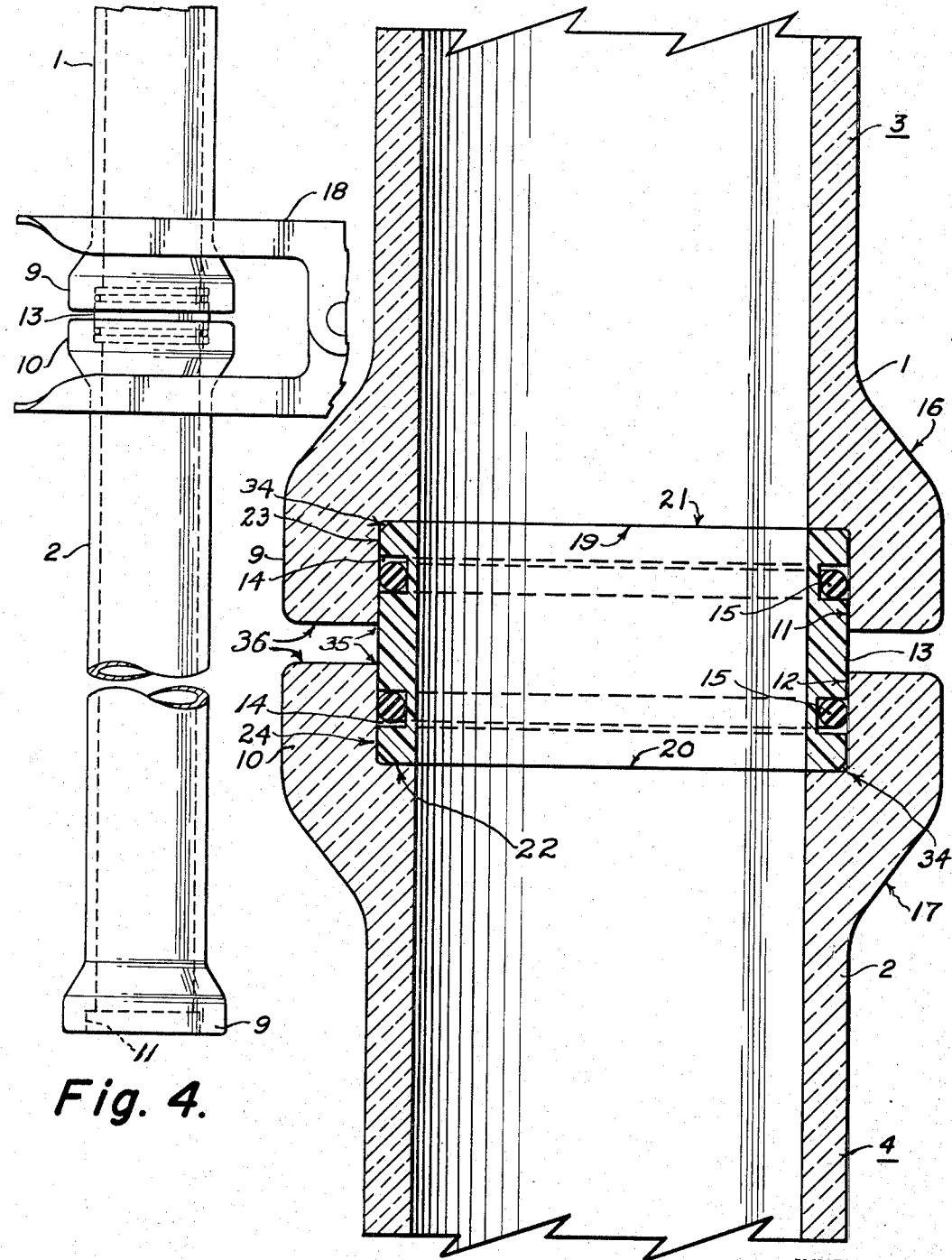
FIGURE 4 represents an elevational view of a pipe joint embodying the present invention.
FIGURE 5 represents a longitudinal cross-sectional view of the same, on a plane in which the axis of the joint lies.

According to the present invention, each of the two ends 1 and 2 of the two pieces of glass pipe or tubing 3 and 4 to be joined or of the opposite tubular ends 5 an 6 of the two pieces of glassware 7 and 8 to be joined, is provided with an enlargement 9 and 10 which may be designated as a coupling "bell," in which the generally cylindrical recesses or chambers 11 and 12 are provided, of a diameter sufficiently larger than the inner diameter of the glass-pipe or of the tubular-end of the laboratory glassware operatively to receive the below-described coupling-sleeve 13.

The radial wall-thickness of each coupling bell (9 and 10, from outer end thereof to a point substantially beyond the inner end of the coupling chamber (11 and 12) thereof, is at least as great and preferably substantially greater than the radial wall-thickness of the glass-pipe, as shown in FIGURE 5.

The coupling-sleeve 13 is formed of a generally form-retaining though slightly deformable plastic or synthetic resin having a capacity for recovering from a deformation after the deforming force is removed, and which is chemically inert in respect to most liquids and gases, will withstand relatively high temperatures (from about 300° F. up to about 500 F. or 550° F) without deterioration and is non-wetting in relation to liquids and forms a non-adhering, non-seizing or non-freezing fluid-tight contact with a glazed glass surface when pressed thereagainst. The aforementioned plastics are synthetic resins of which the coupling-sleeve 13 is formed are also generally non-brittle by reason of their deformability referred to above (so that when the sleeve is stressed by a misalignment of the axes of the two joined glass members, the sleeve will not crack or break but will instead yield), and such plastics or synthetic resins also have a generally wax-like or "soapy" feel and are capable of sliding or slipping readily over a glazed glass surface in what may be called a self-lubricating relationship therewith. Examples of such plastics or synthetic resins are the polypropylene resins exemplified by the commercially available product marketed under the trademark "Profax," the polyethylene resins exemplified by the commercially available product marketed under the trademark "Marlex," the nylon resins exemplified by the commercially available product marketed under the trademark "Plaskon," the polyvinylchloride resins exemplified by the commercially available product marketed under the trademark "Ultron," the polystyrene resins exemplified by the commercially available product marketed under the trademark "Styron", and the polytetrahaloethylene (or polytetrahalo-olefin) resins or fluorcarbon resins exemplified by the commercially available products marketed under the trademarks "Teflon" and "Kel-F" ("Teflon" being one of the polytetrafluoroethylene resins and "Kel-F" being one of the polytrifluorochloro-ethylene resins).

The axial length of the coupling-sleeve 13 is slightly greater than twice the axial depth of each of the aforementioned recesses or coupling-chambers 11 and 12 in the ends of the glass pipe (3 and 4) or in the tubular-ends of the laboratory glassware (7 and 8) or, otherwise stated, the axial length of the coupling-sleeve 13 is slightly greater than the combined axial lengths of the sleeve-receiving recesses or chambers 11 and 12 in the two juxtaposed pieces of glass pipe or in the two juxtaposed tubular ends of the laboratory glassware. The inner diameter of the coupling-sleeve 13 is substantially the same as the inner diameter of the glass pipe to be coupled or of the tubular connection-ends of the laboratory glassware to be coupled. If the two pieces of glass pipe or if the two tubular connection-ends of the laboratory glassware to be coupled have different inner diameters, then the inner diameter of the coupling-sleeve 13 is preferably made substantially the same as the larger of such two inner diameters of the two pieces of pipe or of the connection-ends of the laboratory glassware.

The coupling-sleeve 13 is provided with an outer diameter larger, by a few thousandths of an inch, than the inner diameter of the aforementioned cylindrical sleeve-receiving sockets or coupling-chambers (11 and 12) in the coupling-bells (9 and 10) of the pipe-ends (1 and 2).

The coupling-sleeve 13 is provided with two ring-receiving grooves 14, in which O-rings 15 of a fluoro-elastomer, (such as "Viton" or the like) are operatively disposed. The relaxed diameter of the O-ring 15 is slightly greater than the outer diameter of the coupling-sleeve 13 and its cross-sectional dimension is preferably slightly less than the width of the ring-receiving groove 14—or, conversely, the width of the ring-receiving groove 14 is preferably slightly greater than the diameter of the cross-section of the O-ring 15.

The location of the ring-receiving grooves 14 is such that when the coupling-sleeve 13 is fully telescoped into the cylindrical sleeve-receiving chambers (11 and 12) of the two juxtaposed pipe-ends (1 and 2), (the O-rings 15 will be sufficiently inside the cylindrical coupling-chambers (11 and 12) of the respective pipe-ends to make the O-rings (15) operative upon the application of fluid pressure thereto from within the pipe.

Any conventional pinch-clamp 18, as, for instance, the pinch-clamp shown in U.S. Patent 2,397,438, may be applied to the oppositely facing inclined rear shoulders 16 and 17 on the coupling-bells (9 and 10) to urge the two coupling-bells (9 and 10) towards each other and to cause the opposite ends (21 and 22) of the coupling-sleeve 13 to "bottom" against the inner annular transverse shoulders or bottoms (19 and 20) of the two opposed coupling-chambers (11 and 12). Because the outer diameter of the coupling-sleeve 13 is slightly greater than that of the inner diameters of the coupling-chambers (11 and 12) in the coupling-bells (9 and 10), the coupling-sleeve 13 is radially compressed to a slight extent when telescoped into the coupling-chambers (11 and 12), and thus makes a radial fluid-seal between its outer cylindrical surface and the inner cylindrical surfaces of the coupling-chambers 11 and 12. This radial fluid-seal is augmented by or may be replaced by the radial seal formed between the O-rings 15 and the inner cylindrical surfaces of the coupling-chambers 11 and 12—such O-ring seals being intensified by the fluid pressure operating thereon. While the sealing character of both the Teflon coupling-sleeve 13 against the glass as well as the O-rings 15 against the glass is referred to as being a fluid-pressure seal, they also seal against vacuums.

The axial compression of the coupling-sleeve 13, with its ends 21 and 22 abutting against the bottoms (19 and 20) of the coupling chambers (11 and 12), in turn forms axial seals. Due to the slight deformability of coupling-sleeve 13, this axial seal as well as the aforementioned radial seals (between the juxtaposed cylindrical surfaces of the coupling-sleeve 13 and of the coupling-chambers 11 and 12) improves with the passage of time if the seals are not disturbed or separated, because the conformance of the seating surfaces of the coupling-sleeve to the glass surfaces increases with continued application of pressure.

Due to the slight flexibility and resiliency of the relatively thin-walled coupling-sleeve 13, the relatively short distances to which the coupling-sleeve 13 and the coupling-chambers (11 and 12) are telescoped in relation to each other, the joint so formed has an appreciable amount of flexibility to accommodate any slight misalignment between the axes of the two pieces of pipe joined or between the axes of the two tubular ends of the laboratory glassware being joined. During any such slight misalignment, the seal is yet maintained both because of the conformability of the material of the coupling-sleeve to the glass surfaces under some pressure, and also because of the O-rings near the outer ends of the coupling-chambers (11 and 12). The flexibility of the coupling-sleeve 13 and the ability of the joint to withstand misalignment without loosening its fluid-seal is further enhanced by the ring-receiving grooves which create still thinner or weakened wall portions and hence more flexible zones in the coupling-sleeve 13, namely, in the portions or zones thereof at the radially inwardmost bottoms of the ring-receiving grooves 14.

FIGURE 8 illustrates the embodiment of the present invention as a joint between the column 25 and the tip 26 of chromatographic apparatus, wherein the coupling-chamber 12 in the tip portion 26 has a greater axial length than that of the coupling-chamber 11 in the column portion 25 and wherein the tubular portion 27 of the tip 26 has a smaller inner diameter than that of the column 25. In this embodiment the greater length of the coupling-chamber 12 accommodates the filter disc 28, which may be a fritted glass disc.

Figure 9:
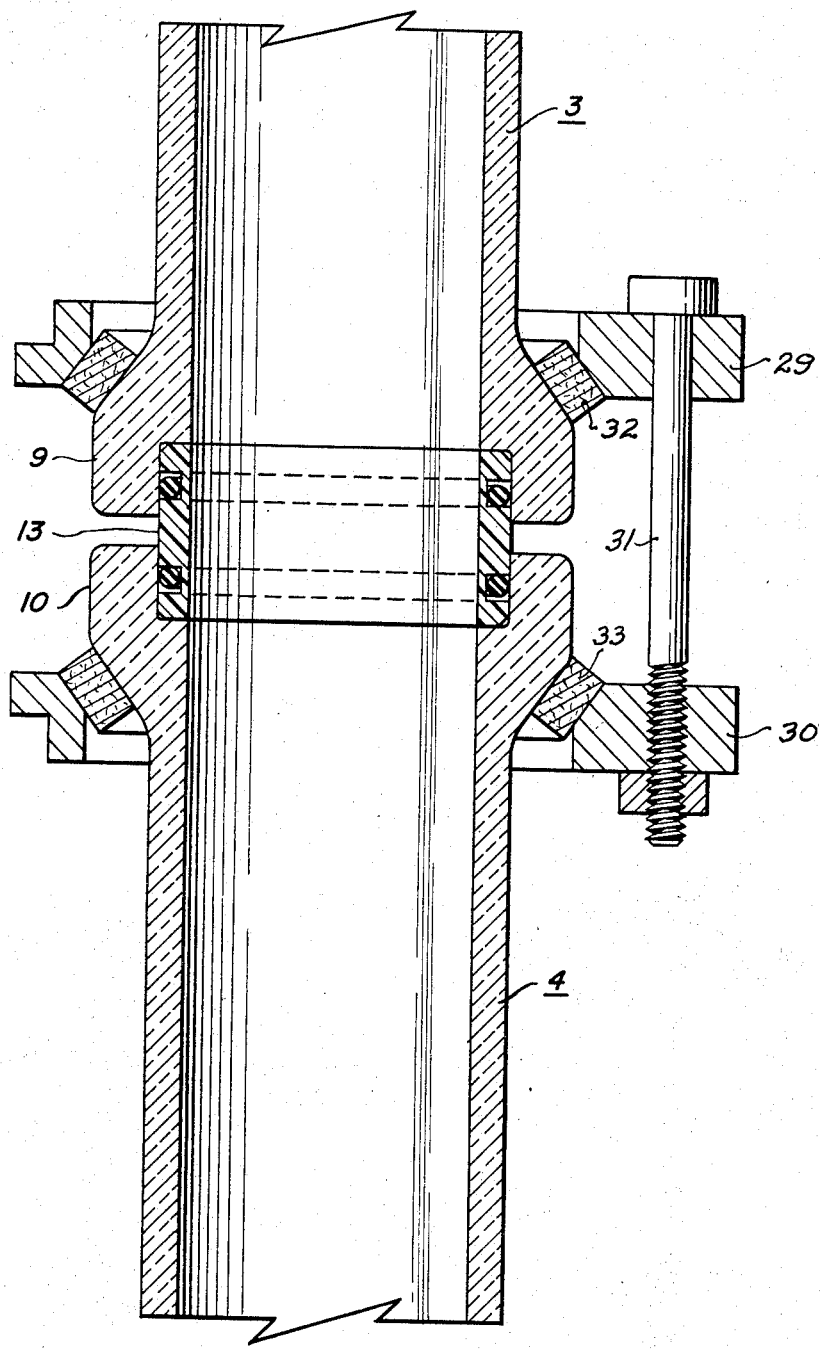
FIGURE 9 represents a longitudinal cross-sectional view of a modified embodiment of the present invention.

The clamping means, as exemplified by the pinch clamp 18 shown in the drawings and as referenced hereinabove, may be used in the embodiment of the present invention in laboratory glassware and in small-diametered glass pipe, such as used in laboratories. For glass pipes of larger diameter, such as used in industrial plants, the conventional flange-and-bolt type clamping means shown in FIGURE 9 may be used for urging the coupling-bells towards each other—the flanges 29 and 30 being drawn towards each other by three bolts 31 (or four such bolts). Split rings 32 and 33 of fibrous or other slightly resilient or compressible material are interposed between the flanges and the rear surfaces 16 and 17 of the coupling-bells 9 and 10. The inner diameters of the flanges 29 and 30 are slightly greater than the outer diameters of the coupling-bells 9 and 10. The coupling-bells 9 and 10 may also be urged towards each other by the conventional threadedly-telescoped external coupling-rings with similar split rings 32 and 33 similarly interposed. Such coupling-fingers and such coupling-rings have central holes of a diameter slightly larger than the outer diameter of the coupling-bells so that they can be placed over and behind the bells, and such holes are tapered the same as the rear clamping surfaces 16 and 17 of the coupling-bells 9 and 10, and split tapered sleeves or rings 32 and 33 of suitable plastic or fiber are interposed between the tapered holes in the flanges or rings and the tapered back surfaces of the coupling-bells.

When embodying the present invention in glass laboratory apparatus in which the internal pressure is relatively low or where the apparatus is under vacuum, and wherein the joined pieces of glass apparatus are supported on supporting rods and are not significantly disturbed, the mechanical clamping means between the opposite coupling-bells may be omitted, because the interference-fit between the outer diameter of the coupling-sleeve 13 and the inner diameters of the cylindrical inner surfaces of the coupling-chambers 11 and 12 is in and of itself sufficient to resist separation of the two pieces of glass apparatus so joined.

The coupling-chambers 11 and 12 are tooled so that the inner cylindrical surfaces thereof as well as the transverse annular shoulders (19 and 20) thereof will be heat-glazed. The resultant glazed cylindrical surfaces co-act with the outer cylindrical surfaces 23 and 24 of the sleeve 13 to form a fluid-pressure resistant radial seal, and the resultant glazed annular shoulders 19 and 20 co-act with the ends 21 and 22 of the sleeve 13 to form fluid-pressure resistant axial seals between the glass and the resinous sleeve. Instead of so heat-glazing the aforementioned glass surfaces (by tooling), these surfaces can also be glazed by fine-grinding and subsequent polishing of the surfaces to a glaze. However, heat-glazing (by tooling) is preferred.

By the joint construction of the present invention, three co-operative fluid-seals are provided between each glass-end and the coupling-sleeve 13. If the fluid within the glass pipe or glass apparatus is under pressure, then the first fluid-seal is an axial seal between the ends of the coupling-sleeve and the transverse annular glass shoulders 19 and 20. Beyond this axial seal, a radial seal is formed between the peripheral portions 23 and 24 of the coupling-sleeve and the glazed cylindrical inner surface of the coupling-chamber. Beyond the last-mentioned radial seal, fluid-intensified radial seals are formed between the O-rings 15 and the glazed cylindrical inner surfaces of the coupling-chamber and the outward or downstream side-wall of the ring-receiving groove and the bottom of the ring-receiving groove. If the glass pipe or glass apparatus is under vacuum, then the three seals are in the reverse order, and the O-ring will seal against the inward side of the ring-receiving groove.

The limited flexibility of the joint construction of the present invention, permitting a limited misalignment between the axes of the two pieces of glass pipe or glass apparatus (or between the axes of their respective coupling-chambers) is due in part to the deformability of the material of the coupling-sleeve, and in part to the relatively short distance to which the coupling-sleeve is telescoped in the coupling-chambers, and in part to the greatly reduced wall-thickness of the coupling-sleeve in the zone of the ring-receiving grooves thereof.

The circular leading edges or outer juncture-circles 34 between the ends (21 and 22) of the coupling-sleeve 13 and the cylindrical surfaces (23 and 24) thereof is rounded or chamfered slightly.

The circular entrance-edges or juncture-circles 35 between the ends 36 of the coupling-bells and the inner cylindrical surfaces of the coupling-chambers 11 and 12 therewithin may also be rounded or chamfered (in cross-section) as indicated in FIGURE 5. However, this latter chamfering is not necessary, and may be undesirable.

Such rounding or chamfering of one or both of said edges or juncture-circles (34 and 35) permits the insertion of the coupling-sleeve 13 into the respective coupling-chambers 11 and 12 notwithstanding that the outer diameter of the coupling-sleeve is greater than the inner diameters of the coupling-chambers. Such chamfering or rounding of at least one of said edges or juncture-circles (34 and 35) preferably the edges 34, permits the gradual compression of the coupling-sleeve 13 so as to reduce its outer diameter and circumference to that of the inner diameter and circumference of the coupling-chamber—as the coupling-sleeve is gradually telescoped into the coupling-chambers. By reason of the coupling-sleeve being formed of an elastomer, such compression of its outer diameter and circumference causes it to exert an outward radial force which presses its outer cylindrical surfaces (23 and 24) into sealing contact with the inner cylindrical surfaces of the coupling-chambers 11 and 12.

The following illustrates typical relationships between the diameters and lengths of the components of the joint of the present invention, as embodied in various sizes of piping or of tabular ends of glass apparatus shown in FIGURES 1 to 7 and 9 and in the column 25 shown in FIGURE 8.

| O.D. of pipe | I.D. of pipe | I.D. of chamber (in.) | O.D. of sleeve (in.) | I.D. of sleeve (in.) | Sleeve thickness at center (in.) | O.D. of bottom of groove (in.) | Sleeve thickness at groove (in.) | Length of sleeve (in.) | Length of each chamber (in.) | Distance between tube-ends (in.) |
|---|---|---|---|---|---|---|---|---|---|---|
| 8 mm. | 2 mm. | .342 | .349 | .080 | .134 | .231 | .075 | .390 | .175 | .040 |
| 8 mm. | 5 mm. | .342 | .350 | .196 | .077 | .231 | .018 | .390 | .175 | .040 |
| .500″ | 9 mm. | .495 | .508 | .350 | .079 | .385 | .018 | .390 | .175 | .040 |
| .750″ | 15 mm. | .750 | .765 | .595 | .085 | .640 | .022 | .420 | .195 | .030 |
| 1″ | 20 mm. | .955 | .970 | .805 | .082 | .845 | .020 | .455 | .195 | .065 |
| 28 mm. | 25 mm. | 1.172 | 1.190 | .975 | .107 | 1.070 | .047 | .455 | .195 | .065 |
| 1.75″ | 40 mm. | 1.866 | 1.891 | 1.574 | .158 | 1.650 | .038 | .860 | .380 | .100 |
| 2.25″ | 50 mm. | 2.279 | 2.304 | 1.968 | .168 | 2.060 | .046 | .890 | .410 | .070 |
| 3.406″ | 3″ | 3.375 | 3.409 | 3.000 | .187 | 3.165 | .082 | .890 | .410 | .070 |
| 4.520″ | 4″ | 4.375 | 4.415 | 4.000 | .187 | 4.171 | .085 | .890 | .410 | .070 |
| 6.656″ | 6″ | 6.375 | 6.428 | 6.000 | .187 | 6.184 | .092 | .890 | .410 | .070 |

Having shown and described an embodiment of the invention, the following is claimed.

1. A joint construction for joining juxtaposed ends of two pieces of glass pipe, the juxtaposed tubular ends of two pieces of glass apparatus and the like, for forming a quick-attachable and quick-demountable fluid-tight joint therebetween, said joint construction including an integral glass coupling-bell on each of the juxtaposed tubular glass ends to be joined, each coupling-bell having a generally cylindrical coupling-chamber therein whose diameter is substantially larger than the inner diameter of the tubular glass end, the generally cylindrical inner surfaces of said coupling-chambers being glazed, transverse annular shoulders intermediate the inner diameters of said tubular glass ends and the inner generally cylindrical surfaces of the coupling-chambers, a coupling-sleeve having an axial length greater than the combined axial lengths of the two coupling-chambers and formed of a generally form-retaining though deformable chemically inert non-wetting and non-brittle synthetic resin which is stable at relatively high temperatures in which forms a non-seizing sealing-contact with a glazed glass surface when pressed thereagainst, said coupling-sleeve being telescoped into said coupling-chambers and having an outer diameter sufficiently larger than the inner diameter of said coupling-chambers to form an interference-fit therewith, a ring-receiving groove in each of the two telescoped portions of said coupling-sleeve, and an O-ring in each of said ring-receiving grooves formed of an elastomer, which is substantially more readily deformable than the synthetic resin of the coupling-sleeve, the free ends of said coupling-bells being spaced from each other when the coupling sleeve is telescoped into said coupling-chambers to the maximum extent possible.

2. A joint construction for joining juxtaposed ends of two pieces of glass pipe, the juxtaposed tubular ends of two pieces of glass apparatus and the like according to claim 1, in which the axial depth of the coupling-chamber is less than its diameter.

3. A joint construction for joining juxtaposed ends of two pieces of glass pipe, the juxtaposed tubular ends of two pieces of glass apparatus and the like, for forming a quick-attachable and quick-demountable fluid-tight joint therebetween, said joint construction including an integral glass coupling-bell on each of the juxtaposed tubular glass ends to be joined, the radial wall-thickness of each coupling-bell from the outer end thereof to a point beyond the inner end of the below-mentioned coupling-chamber therein, being at least as great as the radial wall-thickness of the glass-pipe beyond such coupling-bell, each coupling-bell having a generally cylindrical coupling-chamber therein whose diameter is substantially larger than the inner diameter of the tubular glass end, the generally cylindrical inner surfaces of said coupling-chambers being glazed, transverse annular shoulders intermediate the inner diameters of said tubular glass ends and the inner generally cylindrical surfaces of the coupling-chambers, a coupling-sleeve having an axial length greater than the combined axial lengths of the two coupling-chambers and formed of a generally form-retaining though deformable chemically inert non-wetting and non-brittle synthetic resin which is stable at relatively high temperatures in which forms a non-seizing sealing-contact with a glazed glass surface when pressed thereagainst, said coupling-sleeve being telescoped into said coupling-chambers and having an outer diameter sufficiently larger than the inner diameters of said coupling-chambers to form an interference-fit therewith, a ring-receiving groove in each of the two telescoped portions of said coupling-sleeve, an O-ring in each of said ring-receiving grooves formed of an elastomer which is substantially more readily deformable than the synthetic resin of the coupling-sleeve, and clamping means operatively mounted to the exterior of said two coupling-bells to urge them towards each other and to exert axial force upon the opposite ends of said coupling-sleeve, the free ends of said coupling-bells being spaced from each other when such axial force is exerted by said clamping means.

4. A joint construction for joining juxtaposed ends of two pieces of glass pipe, the juxtaposed tubular ends of two pieces of glass apparatus and the like, for forming a quick-attachable and quick-demountable fluid-tight joint therebetween, said joint construction including an integral glass coupling-bell on each of the juxtaposed tubular glass ends to be joined, the radial wall-thickness of each coupling-bell from the outer end thereof to a point beyond the inner end of the below-mentioned coupling-chamber therein, being at least as great as the radial wall-thickness of the glass-pipe beyond such coupling-bell, each coupling-bell having a generally cylindrical coupling-chamber therein whose diameter is substantially larger than the inner diameter of the tubular glass end and whose axial depth is less than its diameter, the generally cylindrical inner surfaces of said coupling-chambers being glazed, transverse annular shoulders intermediate the inner diameters of said tubular glass ends and the inner generally cylindrical surfaces of the coupling-chambers, a coupling-sleeve having an axial length greater than the combined axial lengths of the two coupling-chambers and formed of a generally form-retaining though deformable chemically inert non-wetting and non-brittle synthetic resin which is stable at relatively high temperatures in which forms a non-seizing sealing-contact with a glazed glass surface when pressed thereagainst, said coupling-sleeve being telescoped into said coupling-chambers and having an outer diameter sufficiently larger than the inner diameters of said coupling-chambers to form an interference-fit therewith, and clamping means operatively mounted to the exterior of said two coupling-bells to urge them towards each other and to exert axial force upon the opposite ends of said coupling-sleeve, the free ends of said coupling-bells being spaced from each other when such axial force is exerted by said clamping means.

5. A joint construction for joining juxtaposed ends of two pieces of glass pipe, the juxtaposed tubular ends of two pieces of glass apparatus and the like according to claim 4 in which the coupling-sleeve has a weakened zone.

6. A joint construction for joining juxtaposed ends of two pieces of glass pipe, the juxtaposed tubular ends of two pieces of glass apparatus and the like according to claim 4 in which the coupling-sleeve has a weakened zone in each of its telescoped portions near the outer ends of the coupling-chambers.

7. A joint for the ends of a glass pipe, laboratory glass apparatus and the like, for forming a quick-attachable and a quick-demountable fluid-tight joint for coupling the juxtaposed tubular glass ends thereof, said joint including a coupling-bell on each of the two juxtaposed tubular glass ends to be joined, each coupling-bell having a generally cylindrical coupling-chamber therein having a diameter substantially larger than the inner diameter of the tubular glass end, transverse annular shoulders intermediate such inner diameters of said tubular glass ends and the inner diameters of the coupling-chambers thereof, a fluorocarbon-resin coupling-sleeve telescoped into said coupling-chambers with the ends thereof abutting said transverse shoulders, said coupling-sleeve having an axial length greater than the combined axial depths of the two coupling-chambers and having an outer diameter sufficiently larger than the inner diameters of said coupling-chambers to form an interference-fit therewith and having a pair of ring-receiving grooves spaced so that when the coupling-sleeve is so telescoped into the opposite coupling-chambers the ring-receiving grooves thereof will be inside the coupling-chambers but near the outer ends thereof, an elastomer O-ring in each of said ring-receiving grooves and having a relaxed outer diameter slightly greater than the outer diameter of the coupling-sleeve and having a transverse cross-sectional dimension slightly less than the width of the ring-receiving groove and having an inner diameter of the order of the inner diameter of the ring-receiving groove.

8. A joint for the ends of a glass pipe, laboratory glass apparatus and the like, for forming a quick-attachable and a quick-demountable fluid-tight joint for coupling the juxtaposed tubular glass ends thereof, said joint including a coupling-bell on each of the two juxtaposed tubular glass ends to be joined, each coupling-bell having a generally cylindrical coupling-chamber therein having a diameter substantially larger than the inner diameters of said tubular glass ends, transverse annular shoulders intermediate such inner diameters of said tubular glass ends and the diameters of the coupling-chambers thereof, a coupling-sleeve formed of a generally form-retaining though deformable chemically inert non-wetting and non-brittle synthetic resin stable at relatively high temperatures and which forms a non-adhering sealing-contact with a glazed glass surface when pressed thereagainst, said coupling-sleeve being telescoped into said coupling-chambers with the ends thereof abutting said transevrse shoulders, said coupling-sleeve having an axial length greater than the combined axial depths of the two coupling-chambers and having an outer diameter sufficiently larger than the inner diameters of said coupling-chambers to form an interference-fit therewith, and clamping means operatively mounted to the exterior of said two coupling-bells, to urge them towards each other and to exert an axial force between the ends of said coupling-sleeve and the aforementioned transverse annular shoulders within said coupling-chambers.

9. A joint-construction for the ends of a glass pipe, laboratory glass apparatus and the like, for forming a quick-attachable and a quick-demountable fluid-tight joint for coupling juxtaposed tubular glass ends thereof, which joint-construction comprises a coupling-bell on each of the two juxtaposed tubular glass ends to be joined, each coupling-bell having a generally cylindrical coupling-chamber formed therein having a diameter substantially larger than the inner diameter of the tubular end thereof, the inner cylindrical surfaces of said coupling chambers being glazed, glazed transverse annular shoulders intermediate such inner diameters of said tubular glass ends and the cylindrical surfaces of the coupling-chambers thereof, a fluorocarbon-resin coupling-sleeve telescoped into said coupling-chambers with the ends thereof abutting said transverse shoulders, said coupling-sleeve having an axial length greater than the combined axial depths of the two coupling-chambers and having an inner diameter generally of the order of the inner diameter of one of said two tubular ends and having an outer diameter sufficiently larger than the inner diameters of said coupling-chambers to form an interference-fit therewith and having a pair of ring-receiving grooves spaced so that when the coupling-sleeve is so telescoped into the opposite coupling-chambers the ring-receiving grooves thereof will be inside the coupling-chambers but near the outer ends thereof, and an elastomer O-ring in each of said ring-receiving groves more readily deformable than said coupling-sleeve and having a relaxed outer diameter slightly greater than the outer diameter of the coupling-sleeve and having a transverse cross-sectional dimension slightly less than the width of the ring-receiving groove and having an inner diameter of the order of the inner diameter of the ring-receiving groove.

10. A joint-construction for the ends of a glass pipe, laboratory glass apparatus and the like, for forming a quick-attachable and a quick-demountable fluid-tight joint for coupling juxtaposed tubular glass ends thereof, which joint-construction comprises a coupling-bell on each of the two juxtaposed tubular glass ends to be joined, each coupling-bell having a generally cylindrical coupling-chamber formed therein having a diameter substantially larger than the inner diameter of the tubular end thereof, the inner cylindrical surfaces of said coupling chambers being glazed, glazed transverse annular shoulders intermediate such inner diameters of said tubular glass ends and the cylindrical surfaces of the coupling-chambers thereof, a fluorocarbon-resin coupling-sleeve telescoped into said coupling-chambers with the ends thereof abutting said transverse shoulders, said coupling-sleeve having an axial length greater than the combined axial depths of the two coupling-chambers and having an inner diameter generally of the order of the inner diameter of one of said two tubular ends and having an outer diameter sufficiently larger than the inner diameters of said coupling-chambers to form an interference-fit therewith and having a pair of ring-receiving grooves spaced so that when the coupling-sleeve is so telescoped into the opposite coupling-chambers the ring-receiving grooves thereof will be inside the coupling-chambers but near the outer ends thereof, an elastomer O-ring in each of said ring-receiving grooves more readily deformable than said coupling-sleeve and having a relaxed outer diameter slightly greater than the outer diameter of the coupling-sleeve and having a transverse cross-sectional dimension slightly less than the width of the ring-receiving groove and having an inner diameter of the order of the inner diameter of the ring-receiving groove, and clamping means operatively mounted to the exterior of said two coupling-bells, to urge them towards each other and to exert an axial force between the ends of said coupling-sleeve to the aforementioned transverse annular shoulders within said coupling-chambers.

References Cited

UNITED STATES PATENTS

| | | | |
|---|---|---|---|
| 2,403,364 | 7/1946 | Hertzell et al. | 285—370 X |
| 2,453,669 | 11/1948 | Meneses. | |
| 3,183,713 | 5/1965 | Gilmont | 285—397 X |
| 3,212,798 | 10/1965 | Lewis. | |
| 3,221,746 | 12/1965 | Noble | 285—397 X |
| 3,224,797 | 12/1965 | Hausmann et al. | 285—370 X |

FOREIGN PATENTS

| | | |
|---|---|---|
| 1,292,738 | 3/1962 | France. |
| 914,803 | 7/1954 | Germany. |
| 595,001 | 6/1959 | Italy. |

CARL W. TOMLIN, *Primary Examiner.*

THOMAS F. CALLAGHAN, EDWARD C. ALLEN,
*Examiners.*